Figure 1:
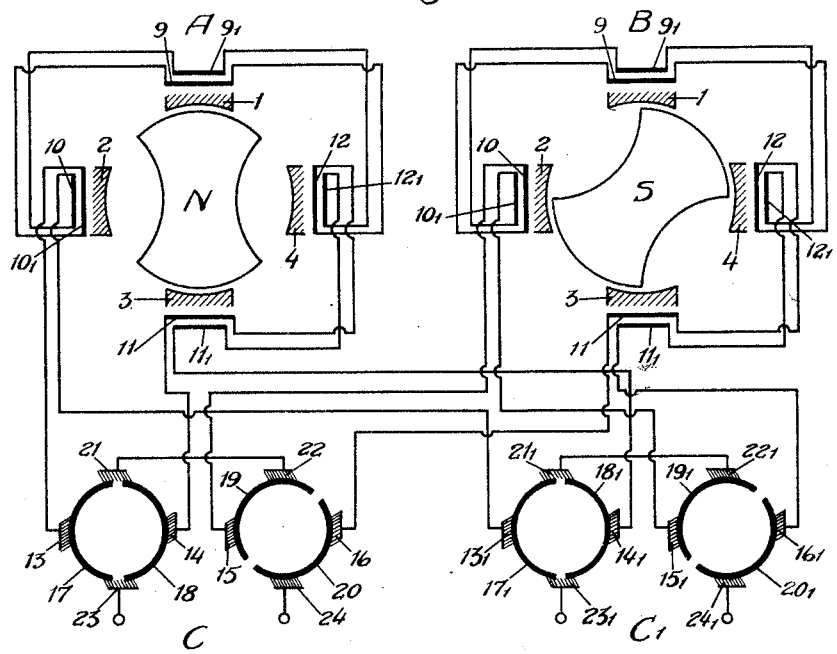

April 25, 1933.  B. C. VON PLATEN  1,905,660

ELECTRIC MACHINE

Filed April 23, 1930  3 Sheets-Sheet 1

April 25, 1933.  B. C. VON PLATEN  1,905,660
ELECTRIC MACHINE
Filed April 23, 1930  3 Sheets-Sheet 2
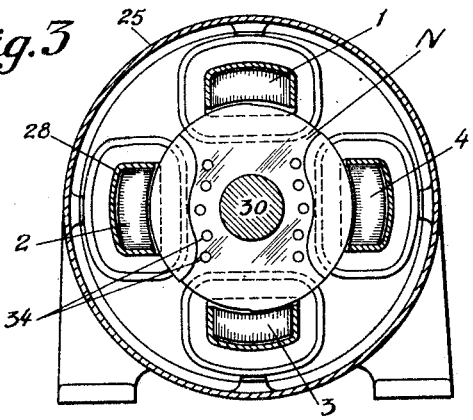
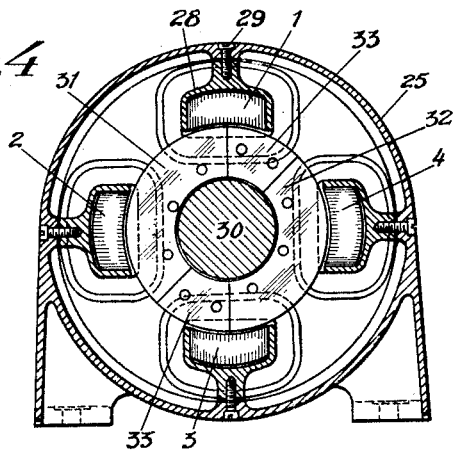
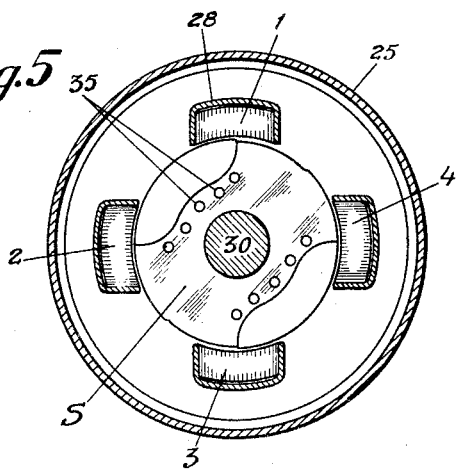

Patented Apr. 25, 1933

1,905,660

UNITED STATES PATENT OFFICE

BALTZAR CARL von PLATEN, OF STOCKHOLM, SWEDEN

ELECTRIC MACHINE

Application filed April 23, 1930, Serial No. 446,471, and in Sweden May 3, 1929.

My present invention relates to the type of electric machines, i. e. electric generators and motors or rotary transformers, in which in order to convert mechanical energy into electrical energy or vice versa, or in order to transform direct current of a certain voltage into direct current of another voltage, alternating potentials, phase-displaced relatively to each other, are created in two or more winding systems of the machine, said alternating potentials, after having been rectified by means of suitable commutators, being united by connecting the winding systems in series.

An object of my invention is to limit the inductive voltage drop in machines of the type mentioned by decreasing the armature reaction characteristic for this kind of machine caused by the load current. I have found it especially advisable in so-called inductor machines working with a direct current of constant voltage and a constant magnetic flux to provide means for compensating for or limiting the voltage drop caused by the armature reaction in order to prevent the curve of the induced voltage from being distorted and, especially in high voltage machines, to facilitate the commutation. My invention is preferably applicable to electric machines of the last mentioned type.

In accordance with the present invention the armature reaction is prevented from becoming too powerful by so constructing the iron frame of the machine, that the formation of closed magnetic circuits by the iron, or especially laminated iron, which comprises the iron cores of the machine, is avoided, This is attained, according to my invention, by the provision of a so-called field distributor, rotatable relative to the induced windings of the machine, which periodically forms a magnetic connection between the iron cores. The shape and arrangement of said field distributor and the rotor pole pieces relative to each other is such that the armature reaction, in every position of the rotor pole pieces, is prevented from forming a closed undamped circuit through laminated iron only. Of course, in this respect the usual air gaps between the rotating and the stationary iron masses are disregarded and not considered as openings in the magnetic circuits.

For limiting the armature reaction suitable damping devices, such as damping windings, may also be employed.

My invention will be more fully described with reference to the accompanying drawings showing an embodiment of the invention applied to a direct current transformer, for instance a high-voltage transformer, of the kind above set forth in which, when a unidirectional potential of a certain voltage is applied to the motor windings of the transformer, two or more alternating potentials are created which during a certain interval of time becomes zero, said interval being utilized for effecting the commutation of the induced windings of the transformer, so that a unidirectional potential of another voltage than the voltage applied is obtained.

Figure 2:
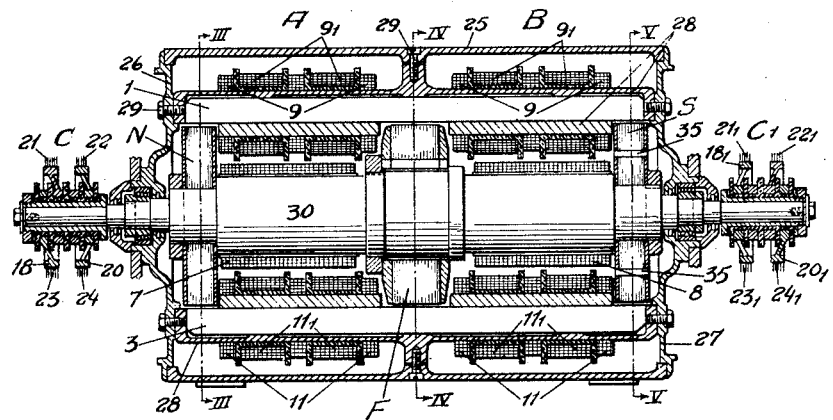

Fig. 1 is a diagram of the connections of the transformer. Fig. 2 shows an axial section thereof. Figs. 3, 4 and 5 show sections along the lines III—III, IV—IV and V—V respectively in Fig. 2. Figs. 6-9 illustrate different positions of the poles relative to the field distributor during the rotation of the rotor through a quarter of a revolution.

In the diagram shown in Fig. 1, reference character N designates a rotating "north"-pole piece and S a rotating "south"-pole piece which are mechanically connected to each other, for instance arranged on the same shaft. The pole pieces N and S are, in the embodiment shown, 45° angularly displaced in relation to each other. The magnetic flux may, as shown in Fig. 2, be created by means of suitable stationary exciting windings (7, 8 Fig. 2). The stator comprises two essentially identical halves A, B which are provided with four cores 1, 2, 3 and 4. One set of induced windings which may be termed the motor windings or primary windings of the machine are designated by reference characters 9, 10, 11 and 12 and are provided on the iron cores 1, 2, 3 and 4, respectively, of the two stator halves.

The windings 9, 10, 11 and 12 of each stator half, together with the portion of cores 1, 2, 3 and 4, respectively, which is in the transverse plane of each of the rotating poles N and S, may be termed stator poles. There are thus four stator poles on each half of the machine, corresponding poles on different halves being magnetically connected by the cores 1, 2, 3 and 4, as is shown in Fig. 2. The stator poles on either half of the machine are magnetically separated. The windings 9, 10, 11 and 12 of each stator half are interconnected in series and connected to contact brushes 13, 14 and 15, 16 respectively of a commutator device C. Said device comprises two parts insulated from each other, each part consisting of two slip-ring segments 17, 18 and 19, 20, respectively. Two interconnected brushes 21, 22 bear against the slip-ring segments of said separated commutator parts and also two brushes 23, 24 are applied in addition thereto, to which a constant voltage is to be applied.

The parts above described form the primary side of the direct current transformer.

On the stator halves A and B further groups of induced windings $9_1$, $10_1$, $11_1$, $12_1$ are arranged, one such group being provided on each stator half. The windings are connected to brushes $13_1$, $14_1$ and $15_1$, $16_1$, respectively, of a commutating device $C_1$. This commutator comprises two parts which are insulated from each other, each consisting of two slip-ring segments $17_1$, $18_1$ and $19_1$, $20_1$. Two interconnected brushes $21_1$, $22_1$ bear against said commutator parts and two brushes $23_1$, $24_1$ are provided from which the transformed voltage is to be delivered.

The parts last described form the generator or secondary side of the direct current transformer.

If a constant voltage is applied to the primary side between the terminals 23 and 24, the rotor N—S is caused to rotate and a varying magnetic flux of constant total magnitude caused by the magnetizing windings (7, 8 Fig. 2) will flow through the stator cores 1, 2, 3 and 4. Said flux will induce alternating potentials in the secondary windings $9_1$—$12_1$ which during a certain interval of time become zero or practically zero. This interval is utilized for effecting the commutation of the secondary windings $9_1$—$12_1$ by means of the commutating device $C_1$, so that a direct current of another voltage than the voltage supplied can be delivered from the secondary side from the terminals connected to the brushes $23_1$ and $24_1$.

If direct current energy is supplied to the primary side, direct current energy can be obtained from the secondary side. The voltage of the secondary side depends on the dimensions of the different parts of the machine.

In Figs. 2–5 is shown a constructive embodiment of a direct current transformer according to the principle above described. In these figures the stator cover is designated by reference character 25 and its bearing shields by characters 26 and 27. In said cover which consists of non-magnetic material, such as aluminum, the stator cores 1—4 of laminated iron are axially arranged between and fixed to the bearing shields and are surrounded by mantles 28 of aluminium serving as damping devices and mechanical supports for the iron cores. The mantles 28 are fixed to the cover 25 and the bearing shields 26 and 27 by means of screws 29. Around said mantles and their iron cores the motor and the induced windings 9—12 and $9_1$—$12_1$ are arranged. The rotor shaft 30 is journalled in the bearing shields 26 and 27 and its ends are provided with commutator devices C and $C_1$. The rotor pole pieces N and S are fixed between press-plates, for instance of copper, on the shaft 30 inside the bearing shields. The rotor pole pieces and the stator cores are made from laminated iron. At the middle of the shaft 30, according to the invention, a field distributor F is arranged between press-plates. The field distributor which also consists of laminated iron is in the embodiment shown fixed to the shaft 30 and rotates together with said shaft. As shown in Fig. 4, the field distributor F comprises two ring segments 31 and 32 respectively. The spaces between these segments, which can be filled with non-magnetic metal segments 33, Fig. 4, are so disposed relative to the pole pieces N and S (Figs. 3 and 5) that they will cover the surfaces formed by the overlapping of the pole pieces N and S if seen in axial direction. The exciting windings 7 and 8 are arranged to surround the shaft 30 and may be either supported by said shaft and rotate therewith or stationary.

The air gap between the rotating pole pieces N, S and the stationary iron cores 1, 2, 3, 4 is, in the embodiment shown, equal to the air gap between the field distributor F and said iron cores, except the parts of the pole pieces corresponding to the spaces between the ring segments 31 and 32 of the field distributor, where the air gap has about twice the size of the air gap elsewhere as will be seen from Figs. 3 and 5. Other shapes may, of course, also be used. This form of the pole surfaces, as well as other shapes thereof of equivalent functioning, serves to keep the total reluctance in the circuits through which the main flux is flowing as constant as possible.

Figure 6:
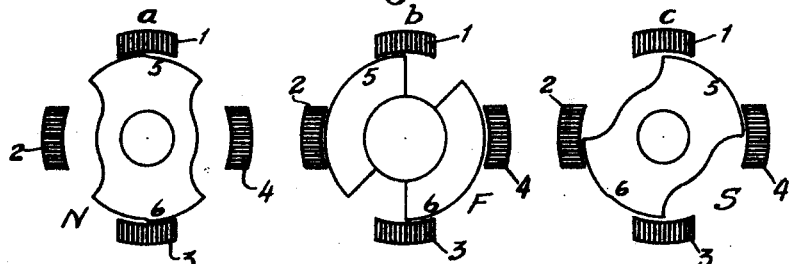
Figure 7:
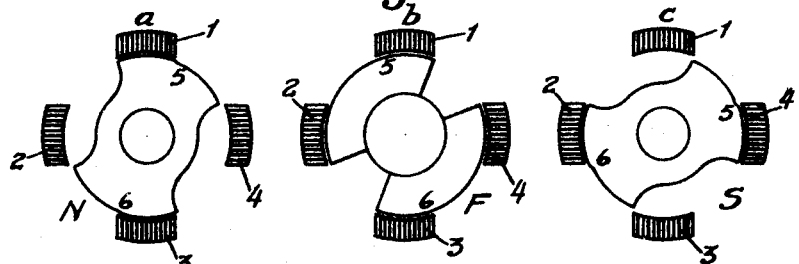
Figure 8:
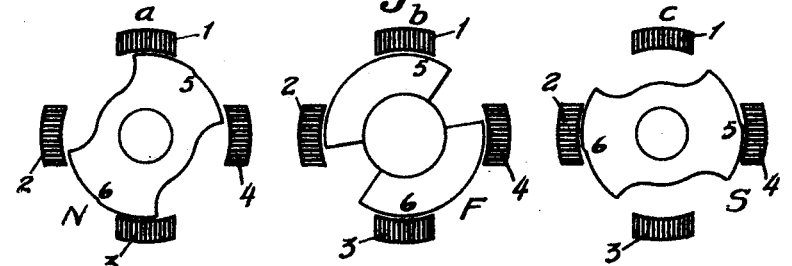
Figure 9:
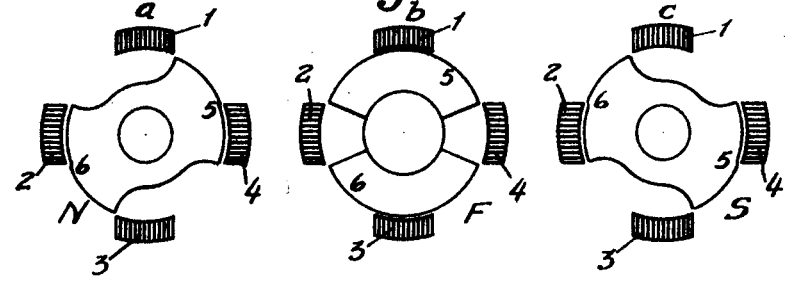

In Figs. 6–9 different positions of the pole pieces N, S and the field distributor F are schematically shown during about a quarter of a full revolution of the rotor. The reference characters $a$, $b$ and $c$ correspond to the sections shown in Figs. 3, 4 and 5 respectively. Reference characters 5 and 6 designate the pole surfaces, the centre angles of which may be 90° and the corresponding angles of the stator cores 45°. In Fig. 6 the initial position of the north pole piece facing one of the stator cores is shown whereas the south pole piece takes a position between said stator core and the stator core next thereto. The position of the rotor after having made an angular movement of 22.5° is shown in Fig. 7 and after 67.5° from the initial position in Fig. 9. In Fig. 8 a middle position between the two last mentioned positions corresponding to Figs. 7 and 9 is shown.

Using the same reference characters as in Figs. 6-9, the path of the useful magnetic flux and the divisions thereof outside the rotor are shown in certain positions in the following diagrams. The total flux is designated by reference character $\phi$ and for each division or rejoining respectively of said flux is in the diagrams the part of the total flux passing through said branch indicated in a parenthesis. The diagrams are based on pure geometrical grounds and under the provision that the lines of force in the iron are following the laminations thereof.

The position shown in Fig. 6 corresponds to the following diagram:

*Diagram I*

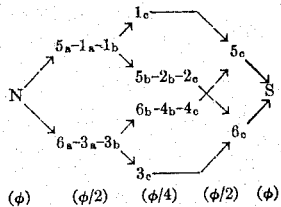

In the position shown in Fig. 8 it is supposed that the part of the surface of the core 1 (or 3) which is covered by the pole surface 5 (or 6 respectively) is $p$ times the corresponding surface in the position shown in Fig. 6. From this it will be evident that the corresponding surface of the core 4 (or 2) in respect of the pole surface 5 (or 6, respectively) will be $q$ times the surface above mentioned where $q=1-p$. The following diagram will be obtained:

*Diagram II*

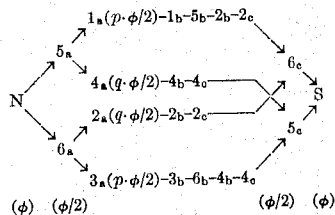

It will be noted that due to the non-magnetic segments 33 of the field distributor, any magnetic circuit which is formed for the armature reaction flux, that is, the flux due to current in the induced windings 9 to 12 and $9_1$ to $12_1$ must pass from one pole surface to the other of at least one of the rotor pole pieces. The following diagram is an example of a possible magnetic circuit for the armature reaction flux in the rotor position shown in Fig. 8.

*Diagram III*

$5_a$–$6_a$–$2_a$–$2_b$–$5_b$–$1_b$–$1_a$–$5_a$ and
$5_a$–$4_a$–$4_b$–$6_b$–$3_b$–$3_a$–$6_a$–$5_a$ It is obvious that other circuits for the armature reaction flux will be obtained in various other positions of the rotor, but in every rotor position these circuits must pass between the pole surfaces of at least one of the rotor pole pieces. The armature reaction flux will not appreciably pass through the rotor shaft because it is a varying flux and said shaft is not laminated. In order to decrease the amount of armature reaction flux, it is necessary therefore to interrupt the passage of the flux between the pole surfaces or to introduce reluctance into the circuit for the reaction flux, preferably without appreciably affecting the unrestricted passage of the main field flux.

Since the main field flux is of substantially constant intensity, it is capable of passing freely through solid iron. Hence, in order to decrease the armature reaction flux, it may be advisable to laminate only the portions of the rotor pole pieces adjacent the air gaps and to form the remainder of the pole pieces of solid iron so as to introduce such a reluctance for the varying armature reaction flux as to amount to practically an interruption of the magnetic circuit therefor. In this way the formation of a closed magnetic circuit of low reluctance for the armature reaction flux is prevented in all positions of the rotor and the inductive voltage drop due to the armature reaction is materially decreased without appreciably affecting the magnetic path for the main field flux.

In order to further limit the armature reaction a damping winding may be provided around the path of the armature reaction through the pole pieces. This can simply be made by connecting the press-plates of the pole pieces to each other in a suitable manner, for instance by bolts 34, Fig. 3, and 35, Fig. 5.

The invention which especially is intended to be applied to machines of the inductor type is, of course, not limited to the direct current transformer shown and described, but is applicable to machines according to similar principles for converting mechanical energy into electrical energy or vice versa. In the first mentioned case either direct current or alternating current can be delivered from the machine.

Having thus described my invention what I claim is:

1. In an electric machine of the inductor type, a rotor having north and south pole pieces spaced axially thereof, and a plurality of stator cores, carrying induced windings, in cooperating position with respect to the rotor pole pieces, the various stator cores and windings cooperating with a single rotor pole piece being magnetically independent whereby the flux due to the current in said induced windings is prevented from flowing in a closed magnetic circuit through said rotor pole pieces and two or more of said cores.

2. In an electric machine having a pair of rotor pole pieces spaced axially thereof, and a set of peripherally spaced stator cores, carrying induced windings, in the transverse plane of each of said rotor pole pieces, the stator cores, carrying induced windings, of each set being magnetically separate, and each stator core of one set being magnetically joined to a stator core of the other set.

3. In an electric machine, a pair of rotor pole pieces spaced axially and mounted in different radial planes, a set of stator cores cooperating with each of said rotor pole pieces, the stator cores comprising each set being magnetically independent of each other, and means associated with said rotor for completing the magnetic circuit between the stator cores which are in alignment with the rotor pole pieces in any given position of said rotor.

4. In an electric machine, a rotor provided with a plurality of rotor pole pieces, a plurality of magnetically independent stator cores cooperating therewith, and means for periodically forming a magnetic circuit between different stator cores comprising a magnetic field distributor mounted on said rotor and rotatable in conjunction therewith.

5. In an electric machine, a rotor having a shaft provided with a plurality of pole pieces, a plurality of magnetically independent stator cores, carrying induced windings, cooperating therewith, and means for periodically forming a magnetic circuit between said stator cores comprising a magnetic field distributor mounted on said rotor and rotatable in conjunction therewith, said field distributor and rotor pole pieces being so arranged that in every position of the rotor flux due to currents in said induced windings is prevented from flowing in a closed magnetic circuit including said shaft.

6. In an electric machine, a rotor having a pair of axially spaced pole pieces of substantial peripheral extent mounted in different radial planes, said poles overlapping in a peripheral direction, and a magnetic field distributor axially spaced with respect to said pole pieces, said field distributor being interrupted in the portions thereof which are in alignment with the peripherally overlapping surfaces of the rotor pieces.

7. In an electric machine of the inductor type, a rotor having a shaft and north and south pole pieces spaced axially thereof, and a plurality of stator cores, carrying induced windings, in cooperating position with respect to the rotor pole pieces, the stator cores and windings cooperating with a single rotor pole piece being magnetically independent whereby the flux due to the current in said induced windings is prevented from flowing in a closed magnetic circuit through said rotor pole piece and two or more of said cores, said rotor pole pieces being laminated only at the parts thereof adjacent the air gaps whereby said flux is prevented from flowing in a magnetic circuit of laminated iron only through said rotor pole pieces and said shaft.

8. In an electric machine having a pair of rotor pole pieces spaced axially thereof, a set of peripherally spaced stator cores, carrying induced windings, in radial alignment with each of said rotor pole pieces, the stator cores of each set being magnetically separate and each stator core of one set being magnetically joined to a stator core of the other set, and damping devices associated with said rotor pole pieces comprising damping windings surrounding the path of the flux through the rotor pole pieces due to current in said induced windings.

9. In an electric machine, a pair of rotor pole pieces spaced axially and mounted in different radial planes, a set of stator cores cooperating with each of said rotor pole pieces, the stator cores comprising each set being magnetically independent of each other, and means associated with said rotor for completing a magnetic circuit of constant reluctance between the stator cores which are in alignment with the rotor pole pieces in any given position of said rotor.

10. In an electric machine having a rotor provided with a plurality of rotor pole pieces, a plurality of magnetically independent stator cores cooperating therewith, and means for periodically forming a magnetic circuit between said stator cores comprising a field distributor consisting of a slotted ring of magnetic material mounted on said rotor and rotatable in conjunction therewith.

11. In an electric machine, a rotor having a shaft provided with a plurality of rotor pole pieces, a plurality of magnetically independent stator cores, carrying induced windings, cooperating therewith, and means for periodically forming a magnetic circuit between said stator cores comprising a field distributor mounted on said rotor and rotatable in conjunction therewith and having a constant air gap with said stator cores, said field distributor and rotor pole pieces being so arranged that in every position of the rotor the flux due to current in said induced windings is prevented from flowing in a closed iron magnetic circuit through said shaft.

12. In an electric machine, a rotor having a pair of axially spaced pole pieces of substantial peripheral extent mounted in different radial planes, said pole pieces overlapping in a peripheral direction, and a field distributor axially spaced with respect to said pole pieces, said field distributor being interrupted in the portions thereof which are in alignment with the peripherally overlapping surfaces of the rotor pole pieces and said rotor pole pieces being recessed to provide an air gap of double width in said peripheral overlapping portions whereby a magnetic path of constant reluctance is obtained for all positions of said rotor.

13. In an electric machine of the inductor type, a rotor having north and south pole pieces spaced axially thereof, and a plurality of stator cores, carrying induced windings, in cooperating position with respect to the rotor pole pieces, the stator cores cooperating with a single rotor pole piece being magnetically independent whereby the flux due to the current in said induced windings is prevented from flowing in a closed magnetic circuit, said rotor pole pieces having damping windings comprising press plates joined by electrical conductors.

14. In an electric machine, a rotor having a pair of axially spaced pole pieces of substantial peripheral extent mounted in different radial planes, said pole pieces overlapping in a peripheral direction, a field distributor axially spaced with respect to said rotor pole pieces, said field distributor being interrupted in the portions thereof which are in alignment with the peripherally overlapping surfaces of the rotor pole pieces, a set of peripherally spaced stator cores in the transverse plane of each of said rotor pole pieces, the stator cores of each set being magnetically separate, the air gap between said field distributor and said cores adjacent the stator being contant and the air gap between said rotor pole pieces and said stator cores being substantially equal thereto except at the peripherally overlapping portions of said rotor pole pieces, said overlapping portions having a substantially wider air gap whereby a magnetic path of constant reluctance is obtained in all positions of said rotor.

15. In an electric machine of the inductor type, a rotor having north and south pole pieces spaced axially thereof and a plurality of stator cores carrying induced windings in cooperating position with respect to the rotor pole pieces, means for maintaining a magnetic circuit for the main flux of substantially constant low reluctance in all positions of said rotor, and means for establishing a magnetic circuit of high reluctance for the flux due to current in said induced windings whereby said last mentioned flux and the inductive voltage drop of said machine due to armature reaction is reduced to a minimum.

16. In an electric machine of the inductor type, a rotor having north and south pole pieces spaced axially thereof, and a plurality of stator cores carrying induced windings in cooperating position with respect to the rotor pole pieces, and a magnetic member associated with said rotor pole pieces and completing a magnetic circuit of substantially constant reluctance for the main field flux in all positions of said rotor and means associated with said rotor for introducing into the path of the flux due to current in said induced windings a reluctance greater than that of laminated iron whereby the inductive voltage drop due to the armature reaction is limited.

17. In an electric machine of the inductor type, a rotor having north and south pole pieces spaced axially thereof, and a plurality of stator cores in cooperating position with respect to the rotor pole pieces, the arrangement being such that the magnetic circuit is normally incomplete, and a magnetic member associated with said rotor pole pieces and independent thereof for completing the magnetic circuit for the main field flux and maintaining said circuit of constant reluctance in all positions of the rotor.

18. In an electric machine of the inductor type, a rotor having north and south pole pieces spaced axially thereof, and a plurality of stator cores carrying induced windings in cooperating position with respect to the rotor pole pieces, the arrangement being such that the magnetic circuit is normally incomplete, and a magnetic member associated with said rotor pole pieces and independent thereof for completing the magnetic circuit for the main field flux and maintaining said circuit of constant reluctance in all positions of the rotor, said magnetic member having means associated therewith for introducing a reluctance into the path of the flux due to current in said induced windings which is greater than the reluctance of laminated iron whereby the inductive voltage drop due to the armature reaction is reduced to a minimum.

In testimony whereof I have affixed my signature.

BALTZAR CARL von PLATEN.